United States Patent [19]

Haynes

[11] Patent Number: 5,207,457
[45] Date of Patent: May 4, 1993

[54] LAMINATED FOLDING MAP

[76] Inventor: Richard J. Haynes, 1991 Catalina Dr., Jackson, Mich. 49201

[21] Appl. No.: 863,028

[22] Filed: Apr. 3, 1992

[51] Int. Cl.$^5$ ............................................. G09B 29/00
[52] U.S. Cl. ...................................... 283/34; 430/904; 434/150
[58] Field of Search ............... 283/34, 35; 281/29; 402/79; 40/904; 434/130, 150, 153; 428/35.2

[56] References Cited

U.S. PATENT DOCUMENTS

| | | | |
|---|---|---|---|
| 3,696,532 | 10/1972 | Nahon | 35/7 R |
| 4,289,333 | 9/1981 | Gaetano | 283/34 X |
| 4,477,254 | 10/1984 | Yokayama | 434/153 |
| 4,540,612 | 9/1985 | Rhyner | 428/13 |
| 4,826,212 | 5/1989 | Muth et al. | 283/34 |
| 4,906,024 | 3/1990 | Lein | 283/34 X |
| 5,063,637 | 11/1991 | Howard, Jr. et al. | 281/29 |
| 5,087,145 | 2/1992 | Cooley | 402/79 |

Primary Examiner—Mark Rosenbaum
Assistant Examiner—Willmon Fridie, Jr.
Attorney, Agent, or Firm—Beaman & Beaman

[57] ABSTRACT

A laminated folding indicia carrier, such as a folding map, consisting of a plurality of laminated rectangular relatively stiff panels, preferably six, wherein an indicia carrier, such as a paper map, is laminated between transparent film. Selected adjacent panels are hingedly connected and pivotal through substantially 360° whereby lateral panels may be selectively folded over either the front or rear face of an associated central panel, and the central panels are hingedly connected for folding over either face of the other central panel. In this manner, any of the identically dimensioned panels may be easily folded as to be visually observed while the folded configuration will be of a single panel size.

4 Claims, 1 Drawing Sheet

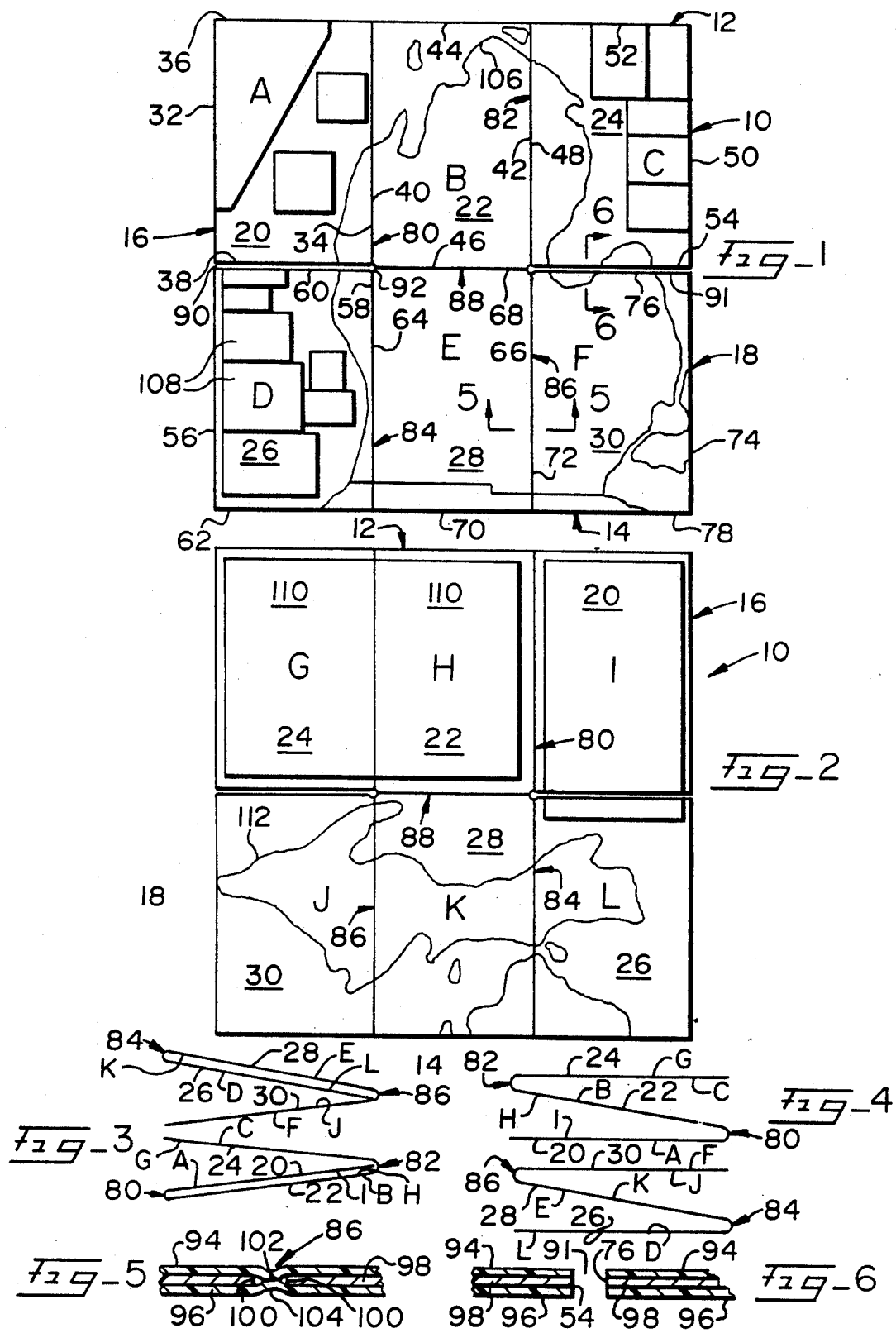

LAMINATED FOLDING MAP

BACKGROUND OF THE INVENTION

1. Field of the Invention

The invention pertains to folding maps and the like wherein the total map appears on a plurality of relatively stiff panels capable of being folded relative to each other such that any face of a given panel may be visually observable with the map in a fully folded condition.

2. Description of Related Art

With maps, and other relatively large sized plans, documents and the like, it is common to use accordion folds to permit the large document to be folded into a relatively concise configuration for storage. The folds of highway maps, for instance, are preset in such a direction as to permit the map to be concisely folded if the same folding sequence is used each time. However, difficulty is often encountered in unfolding the map in such a way as to display only that portion of the map in which the observer is interested, and yet maintain a relatively concise map configuration. As is well known, refolding of the map in the proper sequence is often very difficult to achieve and as the preset folds resist "backfolding" the handling and use of folded maps and large documents is notoriously frustrating.

While it is known to laminate paper documents between transparent sheets of film to protect the document, laminated folding documents are not common. The use of the film will stiffen the document resisting folding and larger laminated documents are not commonly employed in situations wherein the document is routinely handled.

SUMMARY OF THE INVENTION

It is an object of the invention to provide a laminated folding indicia carrier such as a map wherein the map may be disposed upon a plurality of easily manipulatable and observable laminated panels, and wherein the panels are foldable relative to each other to permit a concise folding of the document to locate the panel to be observed in an observable position, and yet permit the document to be concisely folded for ease of handling and storage.

Another object of the invention is to provide a folding laminated map having images and indicia on both sides thereof wherein the map appears on relatively large observable panels, easily foldable relative to each other, and the panels include hinged connections permitting universal hinging and permitting universal positioning of the desired face of a panel for observation purposes.

Yet another object of the invention is to provide a laminated folding map permitting a large scale map to be divided into a plurality of readily observable smaller panels, and wherein the panels may be readily marked and erased without damage to the map, and where superior durability of the map is achieved for providing an extended usable life.

In the practice of the invention, an indicia carrier, such as a map, commonly printed upon a paper medium, is laminated within a plurality of panels, selective panels being hingedly connected to each other to permit such connected panels to be folded over either face of the associated panels wherein the hinged panels are capable of approximately a 360° pivotal movement relative to each other.

Preferably, six rectangular panels are used which are of identical size, and each includes lateral side edges and end edges. The two center panels have an end panel hingedly connected to each lateral side edge, and the lower end edge of the upper center panel is hingedly connected to the upper end edge of the lower center panel whereby the center panels are hingedly related to each other and may be folded in either direction thereto. The end panels are only hingedly connected to the associated center panel, and the outer lateral side edges, and both end edges of the end panels are free whereby the end panels may be hinged as desired with respect to the associated center panel.

The map, or other document to be viewed, is laminated between sheets of transparent thermoplastic film and each panel will have a relatively stiff physical characteristic although being of only a few thousandths of an inch thick. By laminating the document the film may be marked and easily erased so as to indicate a desired travel plan on a map, for instance, and the lamination of the map substantially adds to its durability.

The hinged connections between adjacent panels must be free and capable of a flat fold in either direction, i.e. capable of approximately a 360° pivoting. Such hinged connections may be provided by forming a linear hinge line by directly heat sealing the laminating film at a hinge line, or it is possible to use a scoring of the film at the hinge line to facilitate hinging.

The indicia carrier or document may extend across the hinge connection if a scoring at the hinge connection is used, rather than heat sealing. With a heat seal hinge connection the indicia document for each panel will be of a dimension slightly less than that of the panel to permit the lamination films to directly engage for heat sealing purposes.

By laminating the indicia carrier in the described manner, and hingedly connecting the panels such that the end panels are capable of folding upon either side of the associated center panel, and by permitting the center panels to be foldable upon either side of each other, a universal folding of a map, or the like, can be readily achieved to permit any panel to be in a fully observable position even though the map is folded to its most concise configuration. Because of the relatively large size of the panels, their relative stiffness, and the ability of the panels to easily hinge and fold in either direction, the confusion and frustrations previously employed with folding maps is eliminated.

BRIEF DESCRIPTION OF THE DRAWING

The aforementioned objects and advantages of the invention will be appreciated from the following description and accompanying drawing wherein:

FIG. 1 is a front view of a laminated folding map in accord with the invention, the map being shown in its fully unfolded condition, FIG. 2 is a rear view of the unfolded map of FIG. 1, FIG. 3 is an end view of the map when folded illustrating one orientation of the panels when folded, FIG. 4 is an end view of the map when folded illustrating another manner that the map may be folded, FIG. 5 is an enlarged detail, elevational, sectional view as taken through a hinge connection along Section 5—5 of FIG. 1, and FIG. 6 is an enlarged detail, elevational, sectional view as taken along Section 6—6 of FIG. 1.

DESCRIPTION OF THE PREFERRED EMBODIMENTS

It is expected that the primary use of the inventive concepts will be with a map, generally indicated at 10, but it is to be appreciated that the indicia carrier may carry indicia such as drawings, photographs, equipment operating instructions, installation instructions, maintenance instructions, and other information for which it is desirable to place upon a large document. For purposes of description, and ease of understanding, the explanation of the invention in conjunction with the map 10 will be readily appreciated.

The map 10 includes an upper edge 12, a lower edge 14, a left edge 16, and a right edge 18, FIG. 1. In a typical highway map situation the length of the edges 12 and 16 may be approximately twenty inches.

The map 10 is divided into six panels of a rectangular configuration and identical size. Each panel being of slightly less than seven inches in horizontal width, and approximately ten inches in vertical dimension. With reference to FIG. 1, the upper left end panel 20 is disposed adjacent the center panel 22, and the end panel 24 is disposed to the right of panel 22. In the bottom row of panels the end panel 26 is located below panel 20, and is disposed adjacent the center panel 28, and the end panel 30 is disposed adjacent center panel 28 at the right thereof, FIG. 1.

With respect to FIG. 1, panel 20 is defined by a left side edge 32, a right side edge 34, an upper end edge 36 and a lower end edge 38. The side edges 32 and 34 are substantially parallel, as are the end edges 36 and 38, which is true with each of the panels.

The upper center panel 22 is defined by a left side edge 40, a right side edge 42, an upper end edge 44, and a lower end edge 46. The right end panel 24 is defined by the left side edge 48, the right side edge 50, the upper end edge 52, and the lower end edge 54.

The lower left end panel 26 is defined by the left side edge 56, the right side edge 58, the upper end edge 60 and the lower end edge 62, while the lower center panel 28 is defined by the left side edge 64, the right side edge 66, the upper end edge 68 and the lower end edge 70. The lower right end panel 30 is defined by the left side edge 72, the right side edge 74, the upper end edge 76, and the lower end edge 78.

As described below, selected panels are interconnected by hinge connections permitting relative folding of panels hingedly interconnected. The hinge connections are of a linear configuration coinciding with the side or end edges of selected panels, as will be appreciated from the following description.

The side edges 34 and 40 of panels 20 and 22, respectively, are hingedly interconnected by the hinge 80. The side edges 42 and 48 of the panels 22 and 24, respectively, are hinged together at hinge 82. The lateral side edges 58 and 64 of the panels 26 and 28, respectively, are hinged at 84, and the lateral side edges 66 and 72 of panels 28 and 30, respectively, are hinged together at 86.

The lower end edge 46 of the panel 22 is hinged to the upper end edge 68 of the panel 28 by hinge 88.

As will be appreciated from FIGS. 1, 2 and 6, a slit 90 exists between the left end panels 20 and 26, and a slit 91 exists between the end panels 24 and 30. Accordingly, the edges 38 and 60 of the panels 20 and 26, respectively, are not interconnected, nor are the edges 54 and 76 of the panels 24 and 30, respectively, interconnected.

The slits 90 and 9 permit the adjacent end edges of these panels to be free, as is important to the practice of the inventive concept.

Preferably, anti-stress enlargements 92 are located at the ends of the slits 90 and 91 to minimize the likelihood of tearing of the slits.

The panels constituting the map 10, and hence, the map 10 itself, are formed by transparent synthetic plastic thermoplastic films 94 and 96 as will be appreciated from FIGS. 5 and 6. The film 94 and 96 may be of the type generally used for the lamination of documents, and the films 94 and 96 are located upon opposite sides of the indicia carrier 98, such as a paper map.

If the hinges 80-88 are to be of a heat sealed type, the map carrier 98 is cut into rectangles slightly less than the area of the panels 20-30 so that the carrier will include edges 100 disposed adjacent the edges of the panels 20-28. By forming the carrier of independent sections the spacing between the carrier edges 100 permits the films 94 and 96 to be heat sealed at 102, FIG. 5, which produces indentations 104 which facilitates hinging at the indentations.

If desired, the carrier 98 may be formed as a single sheet as laminated between the films 94 and 96, and in such instance the carrier 98 will extend through the hinges 80-88, and in order to facilitate hinging the hinges 80-88 may be scored to encourage flexibility and hinging along the linear configuration of the hinge connections.

In FIGS. 1 and 2 an outline 106 of the State of Michigan appears for purposes of illustration. As is often the case, the map may also include enlarged details of city street plans such as located at 108, mileage information may appear in blocks 110, FIG. 2, and a further state outline 112 is located on the rear of the map 10 as shown in FIG. 2.

With respect to FIG. 1, the front faces of the panels 20-30 are represented by letters A through F, respectively, while the rear faces of the panels 20-30, FIG. 2, are represented by the letters G-L, respectively.

The hinge 80 permits the face A to be folded upon face B, or alternately, the face I may be folded upon face H. Hinge 82 permits face C to be folded upon face B, or face G may be folded upon face H. However, it is also possible to fold face C upon face I after face A has been folded upon face B, or face A could be folded upon face G if face C is previously folded upon face B. Likewise, face D may be folded upon face E and face F may be folded upon face L thereafter, or the reverse procedure may be used depending on which face is to be located accessible for viewing.

After the desired end panels 20 and 24 are related to center panel 22 as desired, and end panels 26 and 30 are related to center panel 28 as desired, the panels 22 and 28 may be folded at hinge 88 to expose the desired panel faces. The fact that the panels can be pivoted in either direction about their hinge pivot for a total pivotal movement of substantially 360° permits any combination of folding of hingedly connected panels permitting the map 10 to be folded such that the dimension of the folded map will be equal to that of a single panel, and the desired face will be located on the outside of the folded map for observation. FIGS. 3 and 4 illustrate only two of the many combinations of folding that are possible, and the relative location of the panel faces are indicated. In FIG. 3, faces B and E are available for viewing and in FIG. 4, faces G and L may be fully observed.

Because the lamination of the carrier 98 by the film layers 94 and 96 renders each panel relatively stiff, the panels may be easily handled and folded and the folded map configuration will be easy to handle and observe. Because of the ease of folding, and the fact that the hinges 80–88 are easily folded almost 360° and lay flat and not have a "memory" no special efforts or skill are required to fold the map as desired to permit any panel face to be observable, and the frustrating experiences commonly employed in the folding of maps is eliminated.

It is appreciated that various modifications to the inventive concepts may be apparent to those skilled in the art without departing from the spirit and scope of the invention.

I claim:

1. A laminated folding indicia carrier comprising, in combination, at least first, second, third, fourth, fifth and sixth substantially flat relatively stiff panels of a substantially identical rectangular configuration, each panel including first and second faces located on opposite sides of the plane of the associated panel, first and second substantially parallel lateral edges of equal length and first and second substantially parallel end edges of equal length, each panel comprising a central indicia sheet having indicia defined thereon and said faces comprising transparent sheets of film laminated to the associated indicia sheet, a first hinged connection connecting said first panel second lateral edge to said second panel first lateral edge, a second hinged connection connecting said second panel second lateral edge to said third panel first lateral edge, a third hinged connection connecting said fourth panel second lateral edge to said fifth panel first lateral edge, a fourth hinged connection connecting said fifth panel second lateral edge to said sixth panel first lateral edge, a fifth hinged connection connecting said second panel second end edge to said fifth panel first end edge, said first lateral edges and said first and second end edges of said first and fourth panels being free, said second lateral edges and said first and second end edges of said third and sixth panels being free, and said hinged connections being pivotal through approximately 360° whereby either face of said first and third panels may be folded over either face of said second panel, either face of said fourth and sixth panel may be folded over either face of said fifth panel and either face of said fifth panel may be folded over either face of said second panel.

2. In a laminated folding indicia carrier as in claim 1, said hinged connections being defined by linear sections of said transparent film heat sealed together.

3. In a laminated folding indicia carrier as in claim 1, said hinged connections being defined by linearly scoring said transparent film.

4. In a laminated folding indicia carrier as in claim 1, said central indicia sheet being formed of paper and extending through said hinged connections.

* * * * *